United States Patent
Perritt, Jr.

(10) Patent No.: US 12,334,970 B1
(45) Date of Patent: Jun. 17, 2025

(54) QRP DIGITAL MODE RADIO TRANSCEIVER

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/055,200

(22) Filed: Feb. 17, 2025

(51) Int. Cl.
*H04B 1/3883* (2015.01)
*H04B 1/40* (2015.01)

(52) U.S. Cl.
CPC ............. *H04B 1/3883* (2013.01); *H04B 1/40* (2013.01)

(58) Field of Classification Search
CPC ................................. H04B 1/3883; H04B 1/40
See application file for complete search history.

(56) References Cited

U.S. PATENT DOCUMENTS

| | | | | |
|---|---|---|---|---|
| 5,652,903 A * | 7/1997 | Weng | ..................... | H04B 1/38 |
| | | | | 712/E9.067 |
| 5,666,357 A | 9/1997 | Jangi | | |
| 5,825,979 A | 10/1998 | Tsutsui | | |
| 7,499,008 B2 | 3/2009 | Chen | | |
| 10,181,910 B2 | 1/2019 | Mallik | | |
| 2002/0082047 A1* | 6/2002 | Souissi | ............... | H04L 27/0008 |
| | | | | 455/456.1 |
| 2018/0109411 A1* | 4/2018 | Sen | ......................... | H03C 3/40 |

* cited by examiner

*Primary Examiner* — Nguyen T Vo
(74) *Attorney, Agent, or Firm* — Henry H. Perritt, Jr.

(57) ABSTRACT

A compact system and method for two-way communication via digital radio modes, such as FT4 and FT8, are disclosed. The system includes a multiband transceiver, protol definition files, an audio signal generator, a digital signal processor, an monopole antenna system, a ground system with a ground plane, solar power supply, and a computer interface with input and output capabilities. The system scans a predefined spectrum slice, detects digital mode signals, decodes them, and displays the results on a waterfall display. Users can input data by selecting icons or via a keyboard or microphone, with the latter employing speech-to-text conversion. A user-friendly interface allows message encoding and transmission by selecting specific options, ensuring efficient use of frequency bands licensed for amateur radio. The system is easily adaptable for use by other classes of radio operator.

3 Claims, 10 Drawing Sheets

QRP DIGITAL MODE RADIO TRANSCEIVER

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION BY REFERENCE STATEMENT

Not applicable

STATEMENT REGARDING PRIOR DISCLOSURES BY THE INVENTOR OR A JOINT INVENTOR

Not applicable

REFERENCE TO A TABLE/PROGRAM LISTING/OTHER

Not applicable

BACKGROUND OF THE INVENTION

Field of the Invention

Digital radio communication on high frequencies

Background of the Invention

Amateur radio communication has been a cornerstone of global communication for decades, facilitating contact between operators over short and long distances. Methods and technologies used by radio amateurs also are useful for radio communications by other classes of operators. Indeed radio amateurs often have pioneered and refined new technologies that later came into wide use by the radio user community generally.

Software defined radios ("SDR"s) became possible with the proliferation of fast, inexpensive computers and advances in the mathematics of signal processing, particularly the development of Fast Fourier Transforms ("FFT"s). SDRs are capable of processing large swaths of radio spectrum at once: up to 100 megaherz (MhZ). They can, thus, process all of the signals in the entire high frequency ("HF") band.

They do this in multiple steps. First, they sample the incoming signals at a rate at least twice the bandwidth—according to the Nyquist Theorem. Then they quantize each sample. Third, they apply an FFT to select discrete signals at particular frequencies. Fourth they select one or a group of frequencies for further processing, ultimately presenting information in a form a human user can understand Digital communication signaling protocols have advanced in parallel with radio technology. Morse code was the original digital protocol. Radio telegraphy ("RTTY") has been available since before World War II. More recently, with advancements in digital technology, digital modes such as JT65, PSK31, Hellschreiber, Olivia, Vara, FT4, FT8, and VaraAC have become popular for their efficiency in low-signal-strength environments. These modes allow for effective communication even in challenging conditions, making them an essential tool for amateur radio enthusiasts.

Weak signal digital protocols can be particularly useful in emergency situations or other environments when it is necessary to establish communications from portable facilities without regular sophisticated antenna systems, without of electrical power to power high power transmitters, and without cell service. In these circumstances, VHF and UHF communication may be infeasible because of line of site limitations. Only HF communication can achieve the ranges needed.

Digital-mode signals typically are exchanged between sender and receiver as audio tones with narrow bandwidth within a broader passband equivalent to the passband of a single sideband voice signal.

Systems with easily deployable antennas having high radiation efficiency, effective ground systems for monopole antennas, and portable electricity supplies are not as available as would be desirable.

Most existing systems for digital mode communication require separate components for signal generation, processing, and user interface. For example, a typical operator uses a widely available commercially manufactured HF transceiver. He connects this transceiver through a special cable to a small computer of the desktop or laptop type. He downloads software for processing digital-model signals, and installs that software on the computer. He then sets a multiplicity of values for the interface between the computer running the software and the transceiver. He separately arranges for an antenna system, a ground system, and a power supply.

This fragmentation of components not only increases the cost but also creates a steep learning curve for new users. Additionally, traditional systems lack integration, leading to inefficiencies in signal detection, decoding, and transmission. A need exists for a compact, integrated system that simplifies operation while providing robust performance for amateur radio digital modes.

New digital modes are being developed all the time. Many existing systems are limited in the digital modes they can handle, and make it difficult to install updates with protocols for new modes. Radio operators interested in testing and using the latest modes need radio transceivers capable of being upgraded with new digital communication protocols.

BRIEF SUMMARY OF THE INVENTION

This invention addresses current shortcomings for HF digital communication by providing a fully integrated system that combines a transceiver, digital signal processing, a monopole antenna system with high radiation efficiency, a ground plane system that enhances radiation efficiency, a solar powered electricity supply and an intuitive user interface. It is designed to be user-friendly, affordable, and effective in supporting communication over multiple frequency bands licensed for amateur radio use. It combines a compact hardware device and an associated method for two-way communicating via digital radio modes, such as FT4 and FT8, on bands licensed for amateur radio use.

The system includes a radio transceiver with a frequency control and a display that shows the frequency, the strength, and the duration of decoded signals on a waterfall, pertinent data such as callsign, latitude and longitude, and geographic zone for each decoded signal in a table. An operator can select a particular received signal by a computer mouse click, or by touching the signal's table entry on a touchscreen.

The input to the transceiver is an audio signal generator that generates particular tones according to the protocol defining the digital mode and the output of the transceiver is decoded into text by a digital signal processor according to the same protocol.

A user sets a frequency, and the digital signal processor scans that slice of spectrum from a lower bound, defined by the frequency set by the user, to an upper bound 3 kilohertz above the lower bound, applying a Fast Fourier Transform to represent any signals detected on the waterfall and table display. All of the signals detected in the spectrum slice are displayed simultaneously.

When the user wishes to transmit, he selects a station he wishes to communicate with by tapping on an icon representing the signal from that station, selects from a number of message options by clicking on appropriate labeled icons and then clicks on an icon signifying "transmit." That action causes the audio signal generator to send an encoded message comprising appropriate audio tones to the transceiver.

A computer integrated with the other system components accepts user input and presents system output to a user and executed digital signal processing code, including fast Fourier Transforms.

A user may provide input by tapping virtual keys on a keyboard representation, by tapping icons on a touchscreen, or by speaking words into a microphone feeding a speech to text translator.

Terms and Definitions

DSP is digital signal processing, in which signals are analyzed by digital computer code rather than by analog circuits.

HF is the high-frequency part of the radio spectrum, from 1.6 megaherz to 30 megaherz.

Kiloherz (KHz) is a measurement of frequency: one-thousand cycles per second.

Megaherz (MHz) is a measurement of frequency: one-million cycles per second.

A communications mode or protocol comprises the specification for encoding of information, digitization of signals, and modulation of radio carriers.

QRP signifies lower power communication.

A QSO is a communications session between two or more stations.

RF is radio frequency electromagnetic radiation or the signals transmitted or received through such radiation.

RST is a series of three numbers representing signal readability, strength, and tone.

VHF—very high frequency—30-300 MHZ

UHF—ultra high frequency—300 MHz to 3 gigaherz (GHz)

BRIEF DESCRIPTION OF THE SEVERAL VIEWS OF THE DRAWINGS

To facilitate discussion of any particular element or act, the most significant digit or digits in a reference number refer to the figure number in which that element is first introduced.

DETAILED DESCRIPTION OF THE INVENTION

Figure 1:
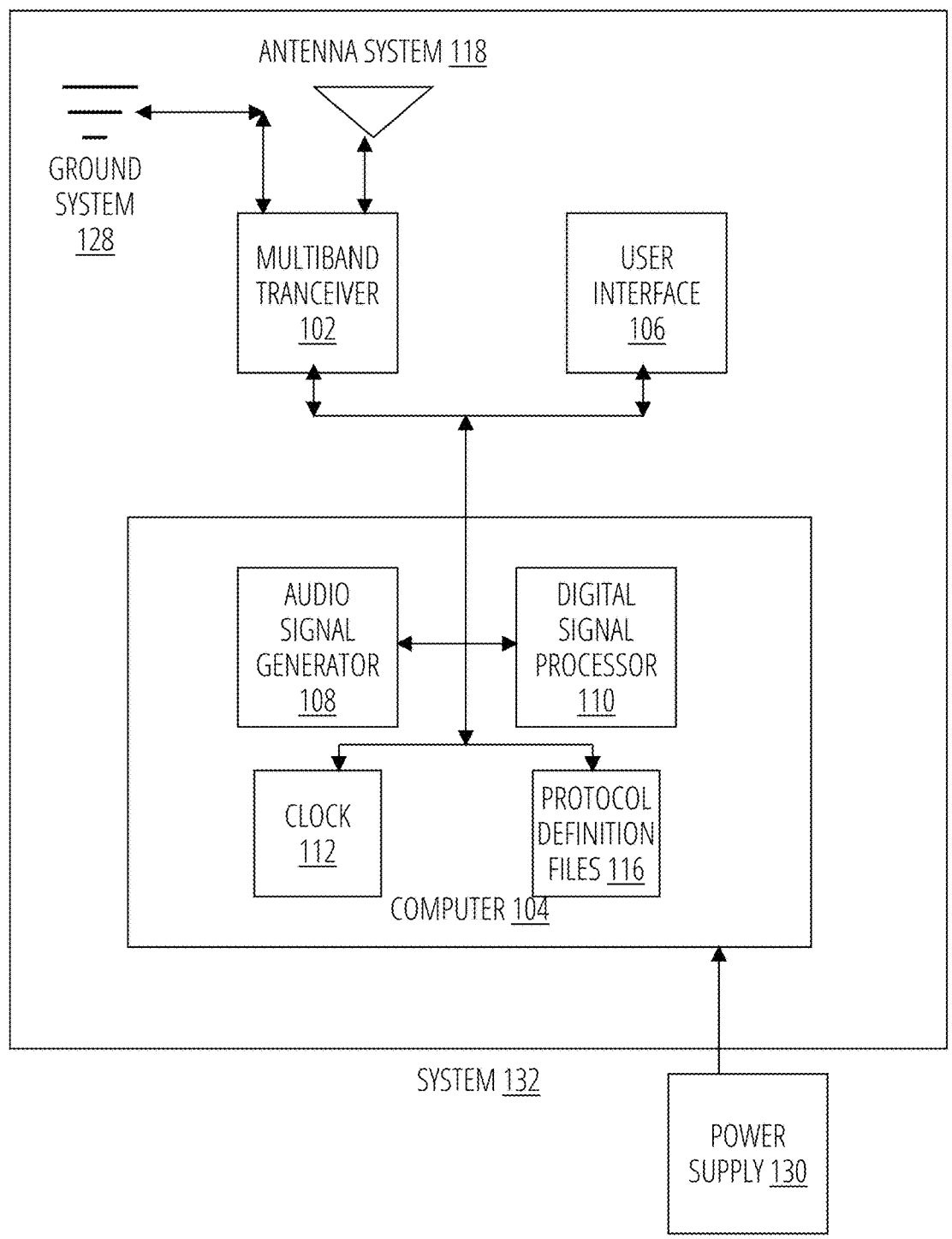
FIG. 1 illustrates the major subsystems of the system.
Figure 2:
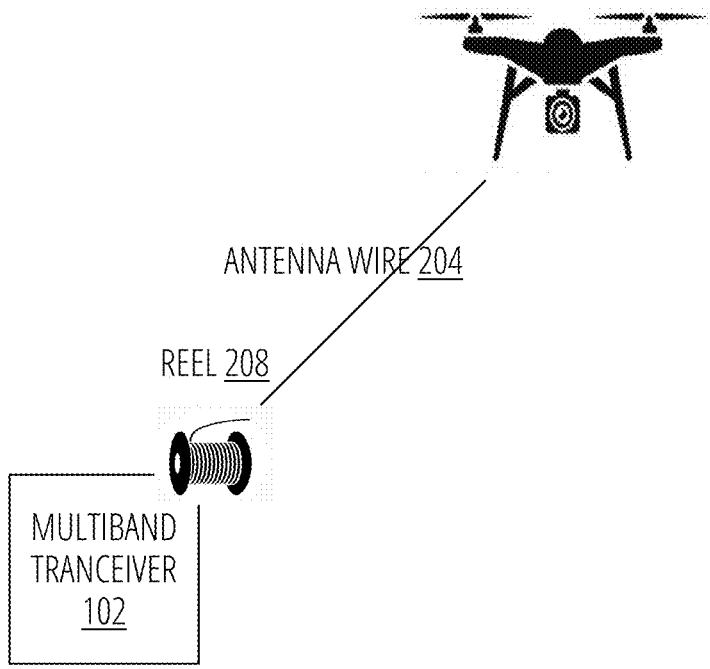
FIG. 2 illustrates an antenna system embodiment in which the antenna wire is lifted by an autonomous aerial vehicle.
Figure 3:
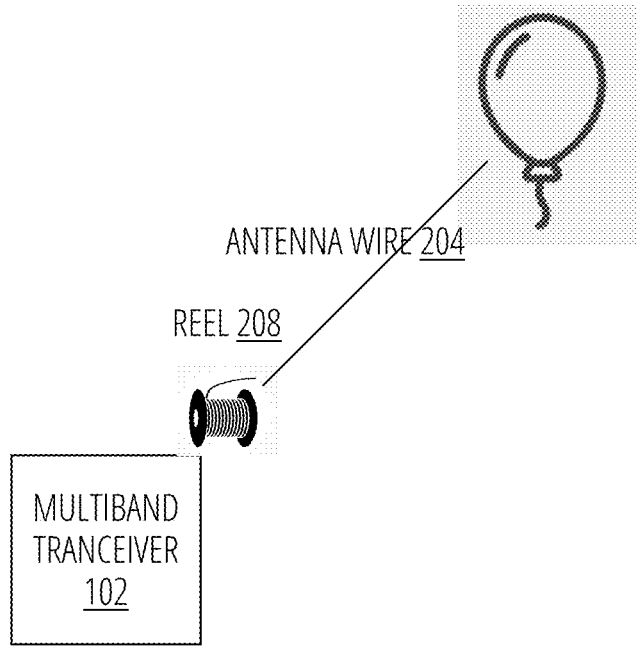
FIG. 3 illustrates an antenna system embodiment in which the antenna wire is lifted by a lighter-than-air balloon.
Figure 4:
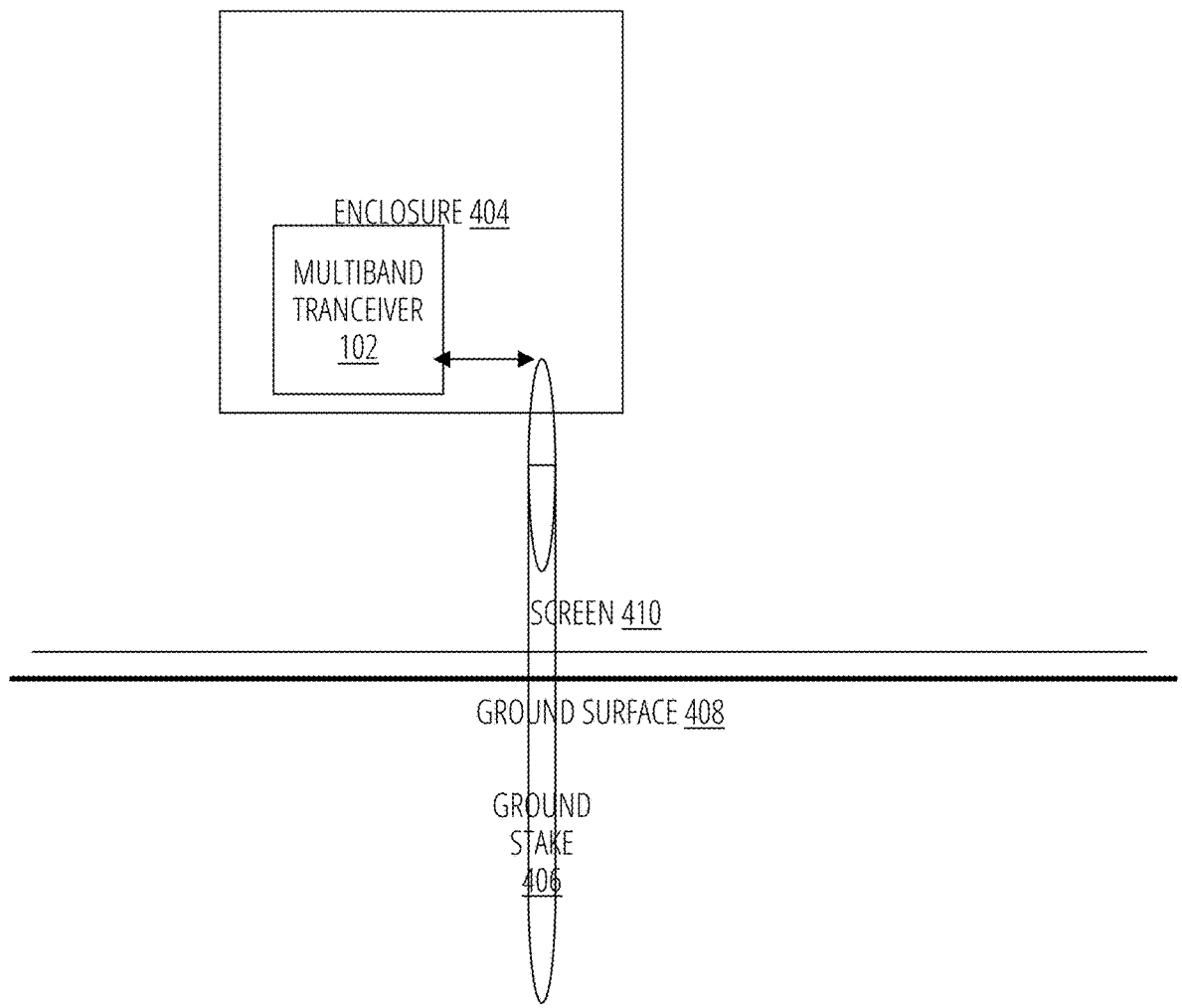
FIG. 4 illustrates the ground system.
Figure 5:
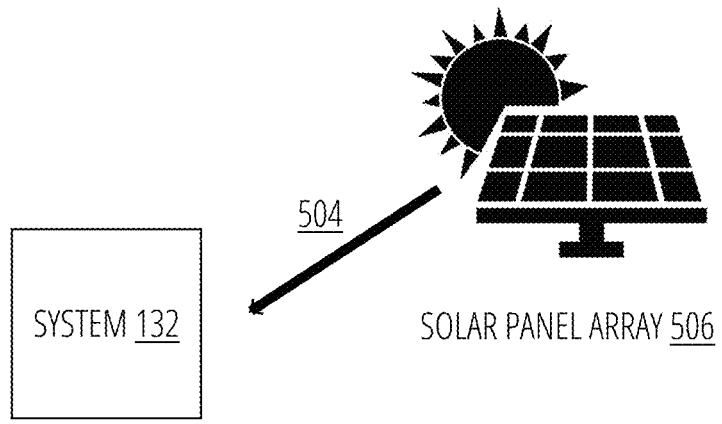
FIG. 5 illustrates the supply of electrical power by means of a solar panel array.
Figure 6:
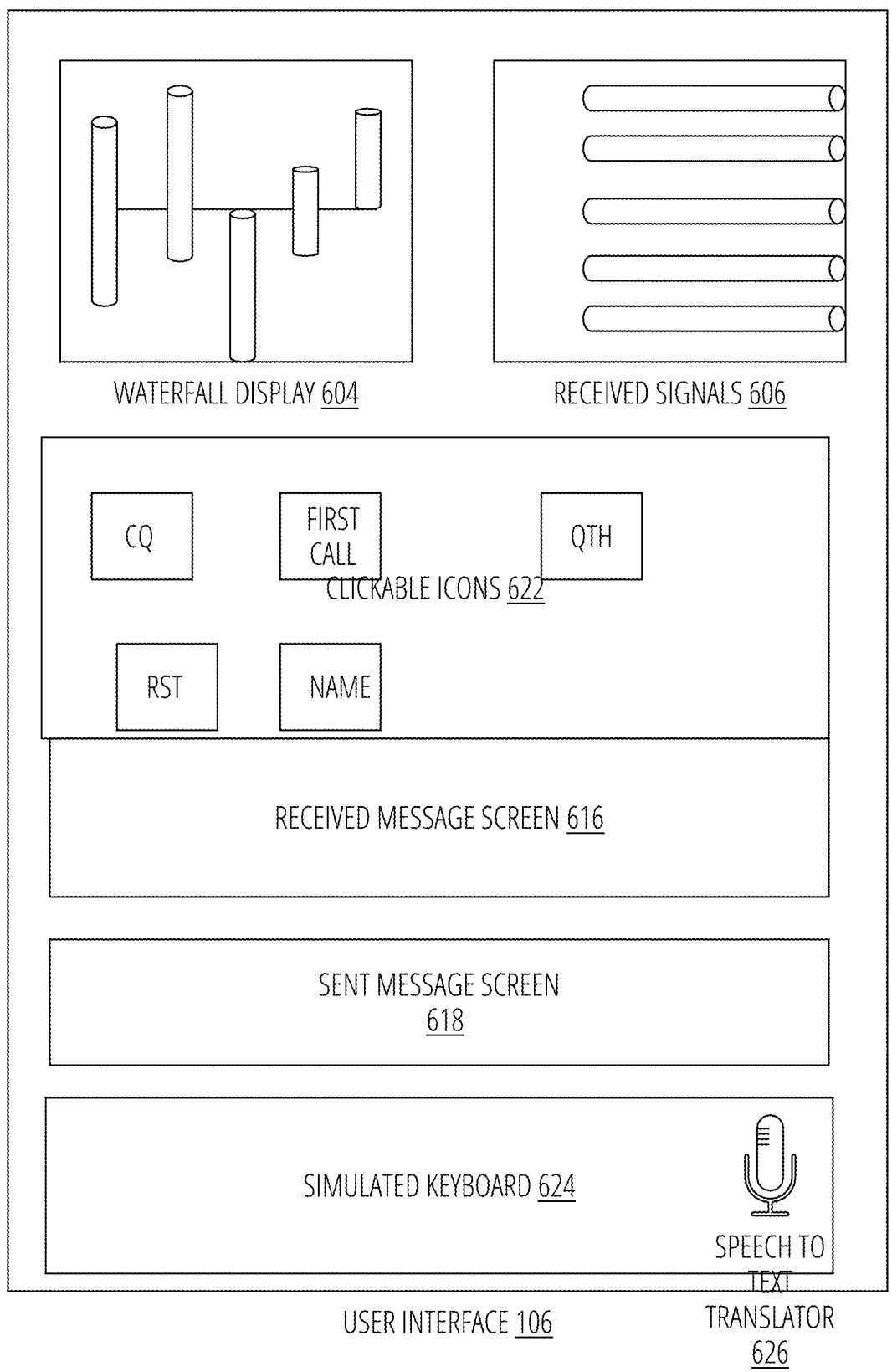
FIG. 6 illustrates the user interface.
Figure 7:
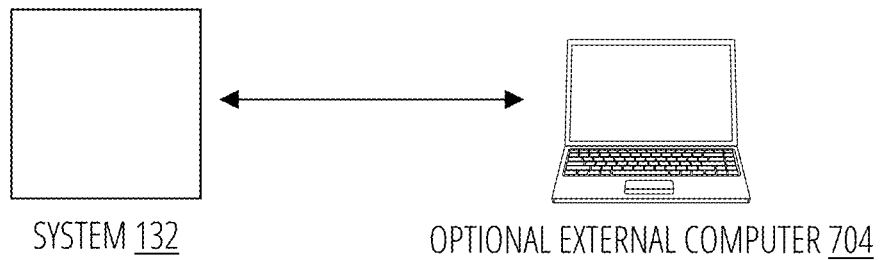
FIG. 7 illustrates an optional external computer connected to the system.
Figure 8:
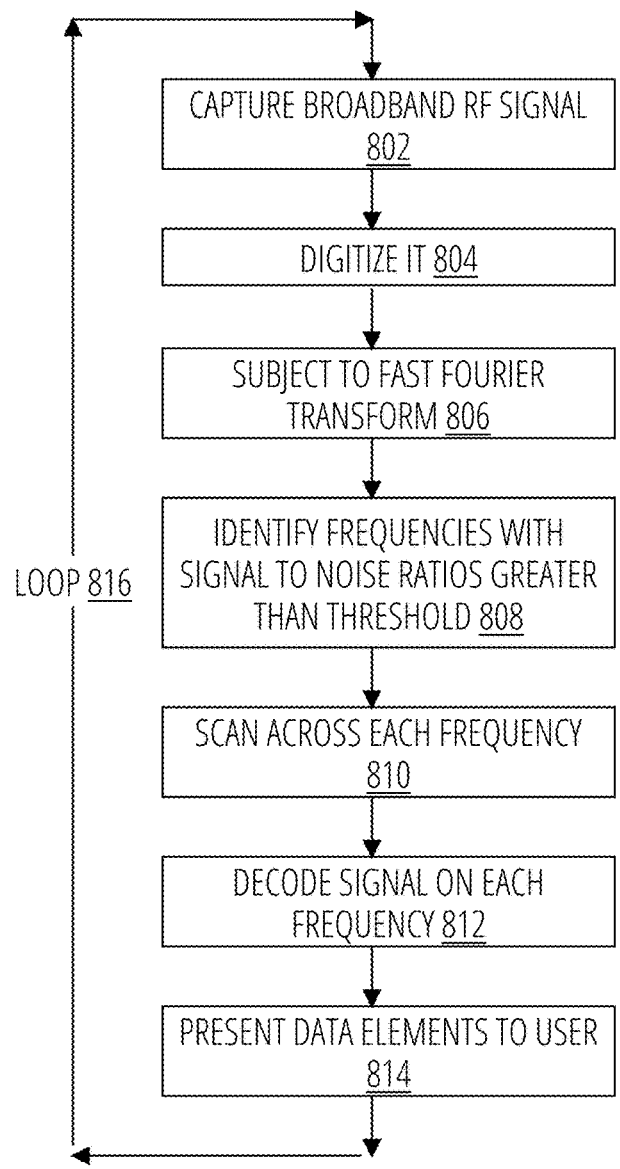
FIG. 8 is a flow chart illustrating the sequence of steps in the receive mode of the transceiver.
Figure 9:
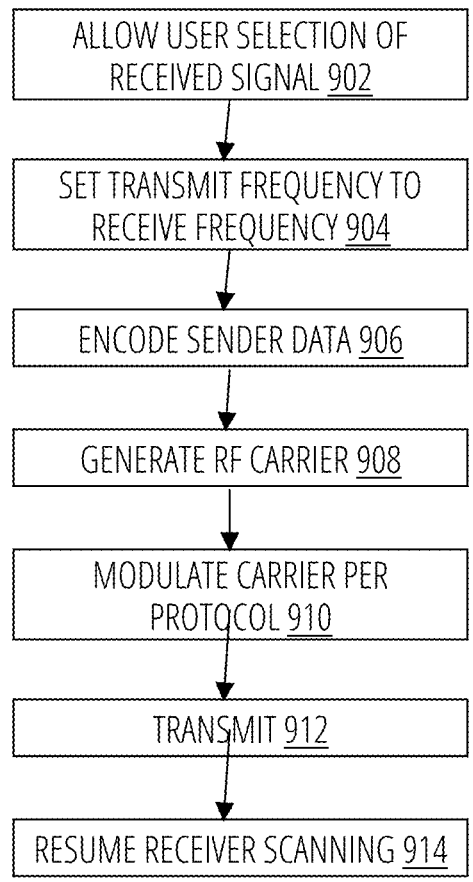
FIG. 9 is a flow chart illustrating the sequence of steps in the transmit mode of the transceiver.
Figure 10:
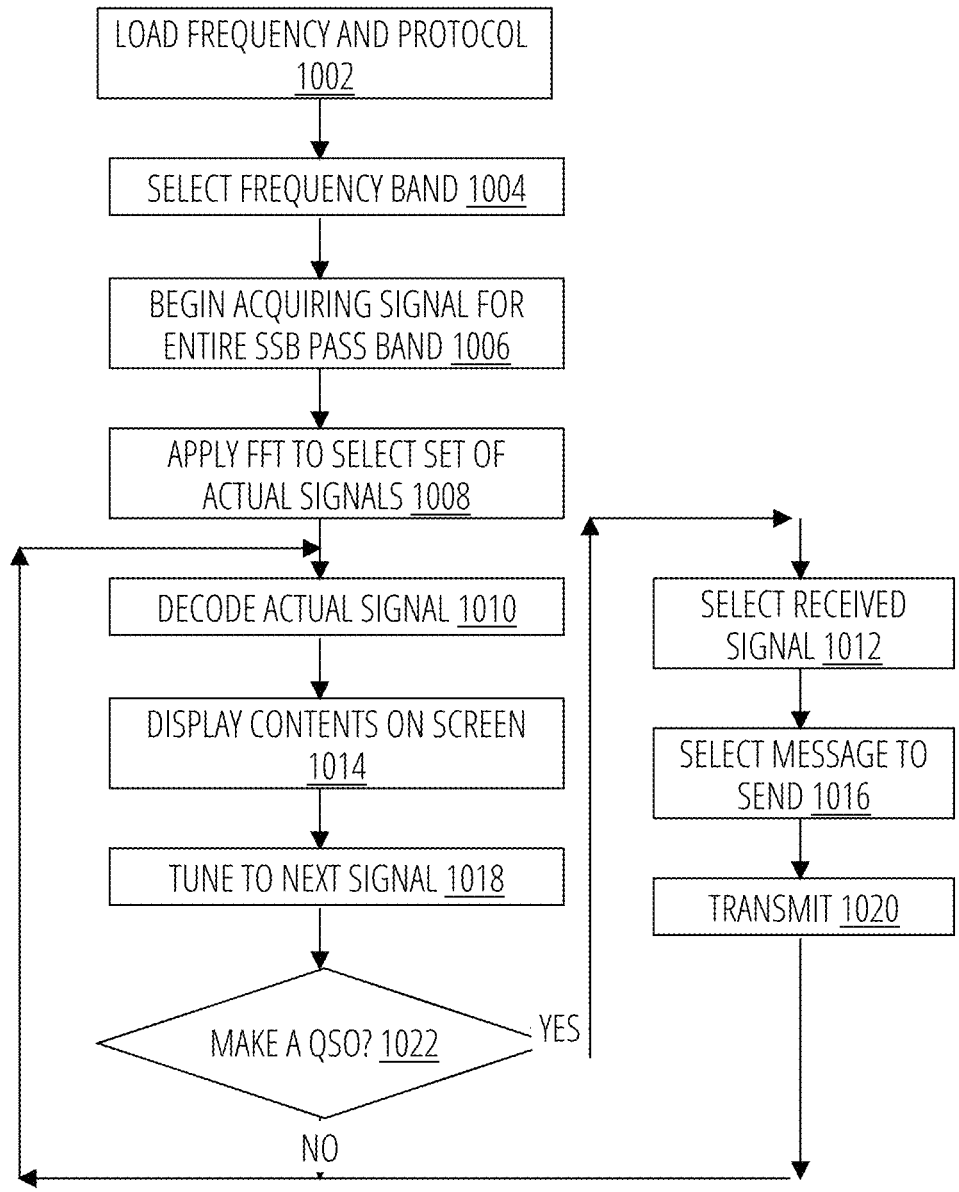
FIG. 10 illustrates user interaction with the system.

The system and method are intended for transmitting and receiving digital mode radio signals.

System Overview

The system comprises a plurality of subsystems packaged together in a single enclosure. The subsystems comprise: a multiband transceiver 102, an antenna system 118, a ground system 128, a user interface 106, and a computer 104. The computer comprises a digital signal processor 110, a clock 112, protocol definition files 116, and an audio signal generator 108.

The multiband transceiver 102 is capable of transmitting and receiving single-sideband signals on amateur radio frequency bands. The transceiver allows for manual frequency selection and seamless integration with other components. The frequency set on the transceiver defines the bottom end of the spectrum slice.

The protocol definition files 116 define modulation type, symbol definitions, symbol rate, bitrate, bandwidth occupied, error correction coding scheme, and data format for protocols, such as RTTY, JT65, PSK31, Hellschreiber, Olivia, Vara, FT4, FT8, and VaraAC.

The audio signal generator 108 subsystem comprises a frequency selector subsystem that enables precise selection of transmission frequencies within the desired spectrum slice, and a tone generator subsystem that generates audio tones according to the protocol requirements of for a digital mode, such as RTTY, JT65, PSK31, Hellschreiber, Olivia, Vara, FT4, FT8, and VaraAC.

The digital signal processor 110 subsystem comprises a signal-recognition subsystem that detects digital mode signals within the spectrum slice, and a tone discriminator subsystem that differentiates and decodes the tones used in digital communication.

The clock 112 subsystem ensures synchronization with broadcast time signals for accurate decoding and transmission.

The user interface 106 subsystem, comprises a waterfall display 604, which represents detected signals on a frequency graph, showing their frequency, strength, and duration, a received signals chart 606 which displays additional data, such as callsigns and geographic information, a plurality of clickable icons 622 on a touchscreen, prompting a user for parameters for receiving and transmitting messages, a simulated keyboard 624, and a speech to text translator 626 that converts spoken words into text for message input, providing an alternative to touchscreen entry. The User Interface subsystem also provides a means for connecting an external keyboard and video display in the form of an optional external computer 704.

The computer 104 has a processing unit and memory.

A computer integration subsystem connects the audio signal generator, dsp, digital clock and user interface to the computer subsystem.

The antenna system 118 comprises an antenna wire 204 and a means for lifting it, either an autonomous aerial vehicle 206 or a lighter than air balloon 308.

Erecting a dipole antenna at a portable radio site presents special challenges, because both ends of the antenna must be lifted and supported, and a feedline, usually comprising coaxial cable which is significantly heavier than antenna wire, must be supported from the middle of the antenna. It is simpler to lift a monopole antenna—a single wire—and feed it from the end, proximate to the antenna. The system uses a monopole antenna.

In one embodiment the system comes equipped with an antenna in the form of antenna wire 204 wound around a reel 208 attached to the enclosure.

The antenna wire 204 can be pulled from the reel 208 from a lifting means, such as an autonomous aerial vehicle 206 or a lighter than air balloon 308.

Monopole antennas present challenges of their own. To have reasonable radiation efficiency they need an effective ground system 128—more than a single conductive stake driven into the ground. Typically, the necessary ground is provided by a ground plane-radial elements laid on top of or just underneath the surface, extending outward from the base of the monopole antenna. Constructing such a ground plane is infeasible in many portable installations at least if the goal is to get on the air quickly.

Experience has shown that a metal screen, resembling an ordinary house or office window screen, constitutes an effective ground plane if it is spread on the ground underneath a monopole antenna.

The ground system 128 comprises a ground stake 406 electrically connected to the Enclosure 404 and the multi-band transceiver 102 within it, said stake being driven into the ground below the ground surface 408 and electrically connected to a metal screen 410 laid on top of the ground surface 408.

The stake comprises conductive material and makes electrical contact with the ground when it is inserted therein. In one embodiment, the electrical effect of the ground is enhanced by a wire mesh comprising a screen 410 laid on top of the ground and electrically connected to the ground stake 406.

In one embodiment, electrical power is provided by a small solar panel array 506 connected to the system 132. A square foot of solar panel can generate about twenty watts of electricity, more than enough to operate the low powered transceiver in the system.

Operation

A user obtains a systems as described in this specification. Files defining signal protocols are obtained and loaded into the system, either at the factory or by the user. These files comprise modulation type, symbol definitions, symbol rate, bitrate, bandwidth occupied, error correction coding scheme, and data format. They may be obtained from the creator of the mode or protocol or they may be created by the user from available information or from experimentation.

Receiving

The system works as follows for receiving. It captures a broadband RF signal 802, comprising the entire HF spectrum. It digitizes it 804 using a sampling rate sufficient to satisfy the Nyquist Theorem. It subjects the digitized signal to a to a Fast Fourier Transform 806, representing it as a plurality of discrete signals at specific frequencies. It identifies frequencies with signal to noise ratios greater than a predefined threshold 808. It scans across each frequency 810, decoding the signal on each frequency 812, and presents data elements for each decoded signal to the user 814.

The user sets the desired frequency range on the transceiver, which defines the lower bound of the spectrum slice within which reception and transmission of signals is possible. The DSP automatically scans from the lower bound to the upper bound (3 kHz above the starting frequency), detecting signals within this spectrum slice.

Software running on the computer 104 detects and captures multiple signals within the bandwidth of a single single-sideband (SSB) spectrum slice efficiently. This capability begins with wideband sampling of the entire spectrum slice, typically 3 kHz in bandwidth, which encompasses the operating range for multiple simultaneous transmissions. The software digitizes this spectrum for subsequent analysis.

The software scans the spectrum slice continuously to identify signals that conform to the specific digital mode's time and frequency synchronization patterns, stopping the scan when a signal is perceived. The software divides the digitized spectrum into narrow sub-bands, each corresponding to a possible signal's frequency. It applies fast Fourier transform (FFT) to the digitized data to identify peaks in the frequency domain, which represent potential signals. FFT is an efficient algorithm used to convert a signal from its time-domain representation into its frequency-domain representation. Each peak in the frequency domain then is analyzed for characteristics such as signal strength and timing to determine what protocol, such as RTTY, JT65, PSK31, Hellschreiber, Olivia, Vara, FT4, FT8, and VaraAC, to which it conforms.

Once the protocol is identified the digital signal processor 110 retrieves the appropriate protocol definition from the protocol definition files 116.

Once candidate signals are identified, the software applies time synchronization checks. This ensures that only signals transmitted within the precise time slots used by a protocol such as FT4 and FT8, are considered valid. Signals failing this synchronization test are discarded, preventing interference or spurious detections from being processed further.

The software then decodes valid signals individually, in parallel. Advanced digital signal processing techniques allow the software to handle multiple signals simultaneously, leveraging modern computing power to maintain accuracy and efficiency. Each signal is treated as an independent data stream, enabling the simultaneous decoding of multiple transmissions within the same spectrum slice.

While a signal is being decoded, the system resumes the scan and repeats the steps of scanning, stopping, and decoding until the scan reaches the upper bound of the frequency then restarting the scan at the lower bound of the frequency.

Users can interpret this decoded data to identify active stations, analyze signal quality, and select stations for communication. This comprehensive approach to signal acquisition and decoding enables efficient and reliable digital mode communication, even under suboptimal conditions.

The software also may apply narrowband filtering, once a potential signal is identified, to isolate the signal from background noise and other transmissions. This filtering is essential in separating the desired signal, given the typically noisy and crowded nature of amateur radio bands. The filtered signal is then sampled and converted into a digital format for further processing.

The decoding process leverages advanced error correction algorithms, such as Forward Error Correction (FEC). These algorithms compensate for signal degradation caused by interference, fading, or weak transmission power. The software decodes the data packets embedded in the signal, extracting meaningful information like callsigns, signal strength, and geolocation details.

Synchronization is an essential aspect of signal decoding in protocols such as FT4 and FT8. The software relies on highly accurate time signals, often synchronized with internet-based time services or broadcast time standards, to align its processing with the signal's transmission pattern. This synchronization ensures precise decoding, as protocols such as FT4 and FT8 operate within fixed time slots.

Upon detecting a valid signal, the DSP decodes it and displays the result on the waterfall display, showing all captured signals as distinct colored lines or blocks. An associated table presents the user with each decoded signal's metadata, such as callsign, signal strength, signal-to-noise ratio, duration, and geolocation This capability maximizes the utility of the SSB bandwidth, enabling efficient multi-signal communication in busy amateur radio bands.

The system automatically interprets received signals 606 according to the applicable protocol definition file 116 thus enabling automatic transmission of the appropriate response.

Transmitting:

The system works as follows for transmitting. It allows allow user selection of a received signal 902. It detects a command to transmit. It acquires the text of a message to be transmitted; sets the transmit frequency to the received signal frequency 904 or optionally searches for and selects an unoccupied frequency. It encodes the sender's message 906, generates an RF carrier 908, modulates carrier according to the protocol for the digital mode 910, transmits the modulated signal 912, and resumes receiver scanning 914.

Encoding, digitization, and modulation as described in the following paragraphs follow the specifications of the applicable protocol definition file 116.

The software begins the encoding process by converting user-generated messages into digital symbols. The input message, typically comprising a limited number of characters to ensure brevity and efficiency, is first formatted according to the protocol's constraints. This includes adding callsigns, signal reports, and location identifiers to the message template.

Once the message is structured, the software assigns each character or data element to a predefined symbol in the protocol's encoding scheme. These symbols represent specific tone sequences that will be transmitted as audio signals. Each tone is carefully chosen to minimize overlap with other symbols and to ensure robustness against noise and interference.

The system encodes the message into the appropriate digital mode tones. The encoded symbols are then modulated into a series of tones using the protocol's modulation method, such as frequency shift keying (FSK), phase shift keying (PSK), or quadrature amplitude modulation (QAM). The modulation process involves generating audio tones at precise frequencies corresponding to the digital symbols. These tones are arranged in a time-synchronized sequence, adhering to the strict timing requirements of the protocol. Synchronization ensures that the transmitted signal aligns with the receiver's decoding window.

The modulated tones are output as an audio signal, which is fed into the transceiver subsystem's input. The transmitter function in the Transceiver subsystem converts these audio tones into radio-frequency signals, amplifying them for effective transmission across the selected amateur radio band. This process ensures that the encoded message is transmitted accurately and with sufficient power to reach its intended destination.

In typical embodiments, the transmission power is no greater than 5 watts, in some embodiments no greater than 1 watt.

Finally, the software continuously monitors the transmission process to ensure fidelity. Error-checking mechanisms verify that the transmitted tones match the encoded message. In cases of disruption or interference, the system can re-encode and retransmit the message to maximize reliability and successful communication. This streamlined process from message creation to transmission highlights the efficiency and precision digital signal protocols, such as FT4 and FT8.

The DSP identifies an unoccupied frequency within the spectrum slice for transmission; alternatively, the DSP may cause transmission on the same frequency as the received signal frequency 904 for the communications exchange.

The transceiver transmits the modulated signal 912 on the selected frequency.

Transmitted messages are selected according to a combination of user input and automatically in response to the pertinent received message. For example the system automatically responds to a received initial call by transmitting an RST message. It automatically responds to a received name message by transmitting a name message.

The system resumes receiver scanning 914 for additional signals after each operation, ensuring uninterrupted monitoring.

User Input:

From the user's perspective, the system loads the desired frequency and protocol 1002, selects the desired frequency band 1004, begins begin acquiring signals for the entire SSB passband 1006, applies the FFT to a selected set of actual signals 1008, enters a loop in which it decodes an actual signal 1010, displays the contents on screen 1014, tunes to the next signal 1018, and allows the user to decide whether to attempt a QSO with that signal 1022. If the answer is no, it loops back to decode another actual signal 1010. If the user answers "yes," the system selects the received signal 1012, allows the user to select a message to send 1016, transmits it 1020, and loops back to decode the next actual signal received 1010.

Users have a plurality of options for inputting information about desired parameters of operation, such as digital mode, frequency, and contents of transmissions.

Users may select among pre-loaded protocol files representing each of a plurality of digital modes, such as RTTY, JT65, PSK31, Hellschreiber, Olivia, Vara, FT4, FT8, and VaraAC.

Users may select a pre-programmed message for transmission via clickable icons 622 on the touchscreen computer interface.

Messages can be constructed by tapping on the simulated keyboard 624 or representing message fragments from the clickable icons 622 or converted from speech via the speech to text translator 626.

In some embodiments, the system 132 may be connected to an optional external computer 704 providing enhanced visual display and input capability. Such an external portable computer may be use to modify, update, and add digital mode protocol files.

Advantages

Compact Design: Combines multiple components into a single, integrated system.

Combination of elements provides unique advantages: The combination of elements offers speed and ease of setup and ease of operation not previously available.

State of the art low-signal-strength capability: Employs encoding and modulation protocols that enhance signal-to-noise ratios for weak signal use; allows easy updating as new protocols are developed.

User-Friendly Interface: Simplifies operation with intuitive controls and visual displays.

Robust Performance: Detects and decodes signals with high accuracy, even in low-signal environments.

Versatility: Supports multiple digital modes and operates across various radio frequency bands and easily accommodates new modes and protocols.

Accessibility: Offers both manual and voice-based input options, accommodating diverse user preferences.

Radiation efficiency: Lifted antenna system and flexible ground plane groun system enhance radiation efficiency.

Applications

This system is ideal for amateur radio enthusiasts seeking a reliable and efficient platform for digital communication. It is particularly useful in remote locations or during emergencies where reliable communication is critical. The compact design and user-friendly features make it accessible to both experienced operators and newcomers.

Use of the system is not limited to amateur radio operators; it is ideal for other classes of operator who need a means of beyond-line-of-sight radio communications in natural disasters or other situations in which traditional fixed antennas and electrical power are not available.

I claim:

1. A system for transmitting and receiving digital mode radio signals comprising:
    a multiband transceiver configured to transmit and receive single-sideband signals on frequency bands licensed for amateur radio use, wherein the multiband transceiver comprises
    a transmitter circuit connected to an antenna system for transmitting radio signals; and
    a receiver circuit connected to the antenna system for receiving radio signals;
    an audio signal generator electronically connected to said multiband transceiver, wherein the audio signal generator comprises:
    a frequency selector subsystem configured to select audio frequencies for modulation of radio signals; and
    a tone generator subsystem electronically connected to the frequency selector subsystem, wherein the tone generator subsystem generates audio tones at the selected frequencies;
    a digital signal processor electronically connected to receive signals from the multiband transceiver, wherein the digital signal processor comprises:
    a signal-recognition subsystem configured to identify digital signal patterns in received radio transmissions;
    a tone discriminator subsystem electronically connected to the signal-recognition subsystem, wherein the tone discriminator subsystem distinguishes between different audio tones in the received signals;
    protocol files stored in a memory device and accessible by the digital signal processor, wherein the protocol files contain instructions for encoding and decoding specific digital modes;
    a digital clock electronically connected to the digital signal processor and to the tone generator subsystem, wherein the digital clock is configured to be synchronized with broadcast time signals for timing digital transmissions and reception;
    a computer electronically connected to the digital signal processor and tone generator subsystem, wherein the computer comprises:
    a processing unit configured to execute instructions for digital radio communications;
    a speech to text translator configured to convert spoken audio to digital text for transmission;
    the memory device configured to store digital radio communications data, protocol files, and user settings;
    an interface electronically connecting the audio signal generator and the digital signal processor to the computer,
    wherein the interface enables the computer to control the operation of the audio signal generator and digital signal processor;
    a user interface electronically connected to the computer, wherein the user interface comprises:
    a simulated keyboard displayed on a screen for text input;
    a waterfall display configured to visually represent received radio signals as colored lines corresponding to signal strength and frequency;
    clickable icons for controlling transceiver functions;
    a received message screen for displaying decoded digital messages;
    a send message screen for composing outgoing digital messages; and
    a microphone electronically connected to the speech to text translator;
    the antenna system electronically connected to the multiband transceiver, wherein the antenna system is configured to transmit and receive radio signals within user-selected radio frequencies;
    a ground system electrically connected to the multiband transceiver and antenna system for providing electrical grounding; and
    a power supply electrically connected to provide operating power to the multiband transceiver, audio signal generator, digital signal processor, digital clock, computer, and user interface.

2. The system of claim 1, wherein the multiband transceiver includes a power amplifier configured to limit transmitter power to five watts or less, thereby operating as a QRP (low power) transceiver.

3. A method for transmitting and receiving digital mode radio signals comprising:
    obtaining a system comprising:
        a multiband transceiver;
        an audio signal generator;
        a digital signal processor;
        a digital clock;
        a computer;
        a microphone; and
        a speech to text translator;
        an interface connecting the audio signal generator and the digital signal processor to the computer;
    obtaining protocol files;
    manually setting a frequency on the transceiver;
    automatically scanning said frequency beginning at a lower bound;
    stopping the scan when a signal is perceived;
    decoding the signal;
    presenting the signal as a colored line on a waterfall display;

resuming the scan and repeating the steps of scanning, stopping, and decoding until the scanning reaches an upper bound of the frequency;
restarting the scan at a lower bound of the frequency;
detecting a command to transmit;
acquiring text of a message to be transmitted;
encoding the message;
searching for an unoccupied frequency; and
transmitting the message.

\* \* \* \* \*